US012395482B2

(12) United States Patent
Chotrani et al.

(10) Patent No.: US 12,395,482 B2
(45) Date of Patent: Aug. 19, 2025

(54) TECHNIQUES FOR GENERATING AND USING NONLINKABLE DIGITAL CREDENTIALS

(71) Applicant: Apple Inc., Cupertino, CA (US)

(72) Inventors: Ravi Chotrani, Milpitas, CA (US); Ahmer A. Khan, San Jose, CA (US); David W. Silver, Los Altos, CA (US); Gianpaolo Fasoli, Burlingame, CA (US); Ka Yang, Palo Alto, CA (US); Vishnu Janardhanan, Fremont, CA (US)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 18/205,244

(22) Filed: Jun. 2, 2023

(65) Prior Publication Data

US 2024/0406162 A1 Dec. 5, 2024

(51) Int. Cl.
*H04L 9/40* (2022.01)
*H04L 67/306* (2022.01)

(52) U.S. Cl.
CPC ........ *H04L 63/0823* (2013.01); *H04L 67/306* (2013.01)

(58) Field of Classification Search
CPC .... H04L 63/0823; H04L 67/306; H04L 67/30
USPC ............................................................ 726/5
See application file for complete search history.

(56) References Cited

U.S. PATENT DOCUMENTS

| 2003/0126085 | A1* | 7/2003 | Srinivasan | H04L 9/3265 705/51 |
| 2009/0300747 | A1* | 12/2009 | Ahn | G06F 21/6245 726/9 |
| 2016/0218875 | A1 | 7/2016 | Le Saint et al. | |
| 2016/0323112 | A1 | 11/2016 | Chung | |
| 2016/0358172 | A1* | 12/2016 | Ziat | G06Q 20/227 |
| 2017/0180335 | A1* | 6/2017 | Quinlan | H04L 63/0815 |
| 2017/0187701 | A1 | 6/2017 | Bonnell et al. | |
| 2017/0206374 | A1* | 7/2017 | Bostick | G06F 21/6245 |
| 2018/0091499 | A1 | 3/2018 | Hayes et al. | |
| 2020/0186367 | A1* | 6/2020 | Yang | H04W 4/80 |
| 2022/0312195 | A1* | 9/2022 | Schnabel | H04W 12/06 |
| 2023/0337000 | A1* | 10/2023 | Schnabel | H04W 12/63 |

OTHER PUBLICATIONS

"Iso/iec: ISO/IEC DIS 18013-5", Available online at: https://mobiledl-e5018.web.app/ISO_18013-5_E_draft.pdf, Apr. 2020, 126 pages.

(Continued)

*Primary Examiner* — Kaylee J Huang
(74) *Attorney, Agent, or Firm* — Kilpatrick Townsend & Stockton LLP

(57) ABSTRACT

A computing device can receive a request from a requesting device for one or more data elements associated with a digital credential. The computing device can store the digital credential which includes a set of data elements and a security object. The computing device can determine a subset of the data elements based at least in part on the request. The computing device can generate the response, wherein the response includes the subset of the data elements and the security object. The computing device can transmit the response to the requesting device.

20 Claims, 7 Drawing Sheets

(56) References Cited

OTHER PUBLICATIONS

"The Mobile Driver's License (mDL) and Ecosystem", Secure Technology Alliance; Available online at: https://www.securetechalliance.org/wp-content/uploads/Mobile-Drivers-License-WP-FINAL-Update-March-2020-4.pdf, Mar. 2020, 62 pages.
International Patent Application No. PCT/US2024/031993, "International Search Report and Written Opinion", Sep. 9, 2024, 20 pages.
International Patent Application No. PCT/US2024/031993, "Invitation to Pay Additional Fees and, Where Applicable, Protest Fee", Jul. 19, 2024, 12 pages.
U.S. Appl. No. 18/205,278, "Notice of Allowance", Apr. 4, 2025, 12 pages.

* cited by examiner

TECHNIQUES FOR GENERATING AND USING NONLINKABLE DIGITAL CREDENTIALS

TECHNICAL FIELD

The disclosure generally relates to the generation and use of digital credentials stored on user devices.

BACKGROUND

Credentials, such as a driver's license, are issued by issuers and trusted by relying parties. Digital credentials can likewise be issued by issuers and stored on user devices for use in conveying associated information to relying parties.

DETAILED DESCRIPTION

Figure 1:
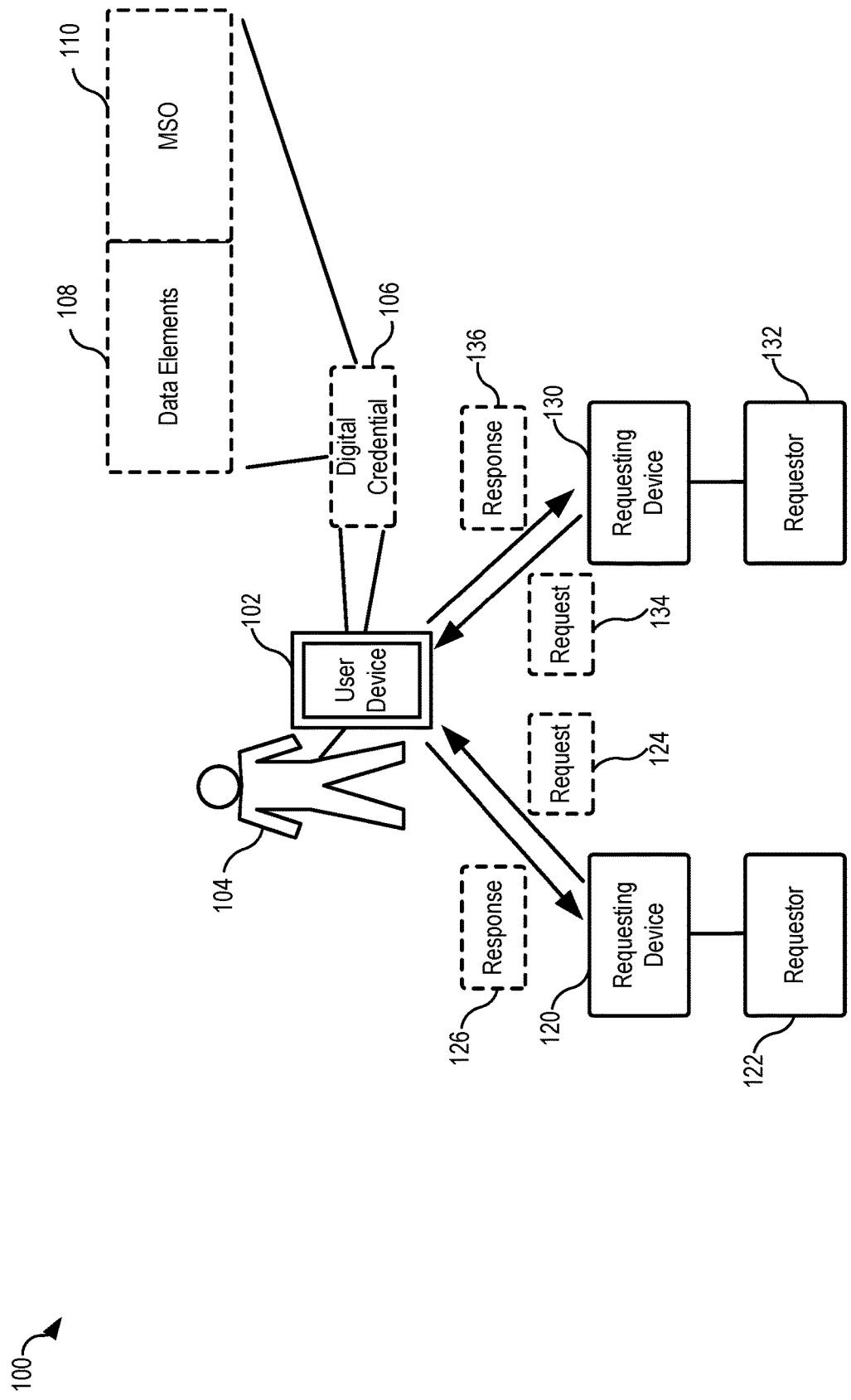
FIG. 1 is a block diagram of an example system for responding to requests for information associated with digital credentials.

Certain embodiments of the present disclosure relate to devices, computer-readable medium, and methods for implementing various techniques for various features of generating digital credentials and responding to requests for digital credentials. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples of the present disclosure are directed to, among other things, methods, systems, devices, and computer-readable media for generating digital credentials and responding to requests for digital credentials. Digital credentials can include any kind of digital document or data structure used to convey information regarding a user (e.g., a digital driver's license, a digital passport, a digital ticket, a digital license, etc.). In some examples, the digital credential can be authorized and/or issued by an issuer. Issuers can be any entity seen as trustworthy or conveying authority to provide digital credentials. For example, a driver's license can be a digital credential where the issuer is a department of motor vehicles or the like. Other examples of digital credentials can include digital passports, digital certifications, or any form of digital identification/verification. Digital credentials are different from traditional credentials in that digital credentials can be stored electronically, for example on a user device such as a smartphone, smartwatch, tablet, laptop, or any other electronic user device.

A digital credential can include data elements and/or a mobile security object (MSO). The data elements can include information regarding the digital credential. In the example of a mobile driver's license (mDL), the data elements can include name, first name, last name, middle name, middle initial, mailing address, address of residence, parts of an address, age, date of birth, a picture of the user/owner of the driver's license, eye color, hair color, height, weight, and other information. Other data elements can include ethnicity, nationality, blood type, etc.

The mobile security object can include information certifying that the digital credential is authentic. The information certifying the digital credential can be divided into security elements. Example security elements can include an issuer signature, a transaction key, and a hash as described herein. In some examples, the MSO can include an issuer signature that certifies that the issuer authorized and issued the digital credential. For example, the issuer signature on an mDL would indicate that the department of motor vehicles, or the like, has issued the mDL. In some examples, the MSO can include a transaction key from a user device and/or user profile that requested the digital credential. For example, a transaction key may have been sent to the department of motor vehicles from the user device that identifies that the user device and/or an associated profile exists and is requesting an mDL. The transaction key can be used by the issuer to issue a digital credential to a specific device and/or profile associated with a user. This can prevent the digital credential from being copied by a different device and/or profile associated with another user. Similarly, the transaction key can be used by the requestor (and the associated requesting device) to identify attempts by unauthorized devices to share fraudulent digital credentials with the requestor. In some examples, the MSO can include an expiration date that identifies when the digital credential is no longer valid. In some examples, the MSO can include a hash where some or all valid data elements of the digital credential are inputs to ensure that the data elements are verifiably immutable. In some examples, the hash can have a random value included as an input in order to generate different hashes even if the valid data elements are all equivalent. By including a random value as an input to the hash, the MSO associated with each mDL can have a different hash value.

A digital credential can be used to verify information regarding a user associated with the digital credential. However, unlike a traditional physical credential, a digital credential can be configured to only present partial information to the requestor or requesting device. For example, a requesting device (e.g., a terminal or point of sale (POS) device or a credential-checking device) at a particular business, entity, or establishment (e.g., a bar or restaurant) may request an age of a user in order to verify that the user is legally able to order alcohol. A user can use the mDL on their user device to respond with only their age and/or birthday because the other information (for example, name and address) associated with the mDL may be unnecessary for entry, or to order the alcohol. This enables digital credentials to maintain a user's privacy more than a traditional physical credential, where showing the traditional identification would convey other information (such as name and address) not necessarily needed for the particular instance.

In some examples, responses to requests for information from a digital credential include the mobile security object of the digital credential. The mobile security object can be used to ensure that the issuer actually issued the digital credential in the same way that a seal, format, bar code, or the like, is used to certify that an issuer issued a traditional physical credential like a driver's license. Additionally, in some cases, the security elements of the mobile security object are immutable at the time of the creation of the digital credential.

Alternatively, in some examples, although responses to different requests for information from a digital credential can be different, the responses can include the same mobile security object. For example, a user may use their mDL to respond with their age to a request at a bar and then also use their mDL to respond with their name, address, and other information to a request from a bank. Although the responses to each requestor (and their respective requesting devices) contain different data elements, both responses could include the same MSO. This may inadvertently enable the responses to be linkable, such that requestors can determine that all the responses are associated with the same user. This could allow the bank and the bar to collude, and potentially link the responses from the user and their mDL in order to share information regarding the user. For example, the bank and the bar could look at the MSO and determine that the same user responded to requests by the bank and the bar. The bank and the bar could then share the information they have regarding the user and ascertain information that was meant to be hidden from the respective parties, for example, the bar could now learn the name and address of the user associated with the mDL. Additionally, in this example, the bank and the bar could link the mDL to a particular person (e.g., the owner of the mDL) even though the user may believe their transaction was otherwise not linked to them. Thus, the methods and techniques described herein provide for nonlinkable digital credentials.

As described herein, a user device can be configured to generate, store, and present multiple instances of a digital credential without a user being aware that they have multiple instances of the digital credential. Different instances of the digital credential can have the same data elements but have different MSOs. For example, a user device can be configured to generate, store, and present multiple different instances of an mDL associated with the user, based on the requestor. Although the data elements (such as name, address, and eye color) are the same for each instance of the mDL, the issuer signature, transaction key, and hash of the mDL data elements can all be unique to the instance of the mDL.

With multiple instances of a digital credential, a user device can use different instances to generate responses to requestors/requesting devices. For example, a user device can use a first instance of the mDL to generate a response to the bar's request for an age and the user device can use a second instance of the mDL to generate a response to the bank's request for name and address. In this way, the responses will include different MSOs corresponding to the instances used to generate the responses such that the bank and bar may not be able to identify that the same user responded to their requests; thus, the mDLs are not linkable to each other or to the user.

Similarly, a user device can determine that a same requestor/requesting device is requesting information associated with the digital credential. For example, if a user goes to a bar and responds with their age to a request, when the user returns to the bar on a later occasion, the user device can respond to a second request for age with the same instance of the digital credential used previously.

When generating multiple instances of a digital credential, the user device can generate a set of multiple transaction keys for use in generating the set of instances of the digital credential. The set of transaction keys can be used to generate a bundle which can be sent to a first server. The first server can verify the request bundle as being authentic from an authorized user device. The first server can send the request bundle to a second sever associated with the issuer of a digital credential. The issuer can use the request bundle, especially the set of transaction keys, to generate a set of instances of the digital credential to be sent to the user device. The second server of the issuer can send the set of instances of the digital credential to the first server. In some examples, the first server can verify the set of instances of the digital credential as being properly and authentically generated by the issuer. In some examples, the first server does not verify the set of instances of the digital credential. The first server can send the set of digital credentials to the user device. The user device can store the set of credentials for use in generating responses to requests for information associated with the digital credential.

A user device can store parts or all of a digital credential in a hardware secure element which is designed to securely store cryptographic information and generate cryptographic information. If the secure element detects tampering, the secure element can destroy any information contained therein to prevent the information from being tampered with or retrieved. In some examples, the application process of the user device stores the digital credential. The digital credential can be stored cryptographically encrypted via a cryptographic key stored in the secure element. As such, the digital credential can be in a format that is unreadable and unalterable without decrypting the digital credential using the cryptographic key stored in the secure element.

Turning now to the figures, FIG. 1 illustrates an example diagram 100 of the digital credential techniques described herein. A user device 102 associated with a user 104 can store one or more types of one or more digital credentials 106 associated with the user 104. An example digital credential can be an electronic form or digital form of a mobile driver's license (mDL), passport, certification, license, or any other form of certification or authorization in digital form. A user device 102 can store multiple types of digital credentials. For example, a user device 102 can have a first type of digital credential in the form of a driver's license, a second type of digital credential in the form of a digital passport, and a third type of digital credential such as a professional license. A digital credential 106 can include data elements 108 and a mobile security object (MSO) 110. The data elements 108 can include information regarding the digital credential. As described herein, in the example of a mobile driver's license (mDL), the data elements 108 can include name, first name, last name, middle name, middle initial, mailing address, address of residence, parts of an address, age, date of birth, a picture of the user/owner of the driver's license, eye color, hair color, height, weight, and other information. In the example of a professional license, data elements 108 can include a license number, a professional phone number, a professional email address, and other information.

The mobile security object 110 can include information certifying that the digital credential 106 is authentic. As described herein, the information certifying the MSO 110 can be divided into security elements. Example security elements can include an issuer signature, a transaction key, and a hash as described herein. In some examples, the MSO 110 can include an issuer signature that certifies that the issuer authorized and issued the digital credential 106. For example, the issuer signature on an mDL would indicate that the department of motor vehicles, or the like, has issued the mDL. In some examples, the MSO 110 can include a transaction key from a user device and/or user profile that requested the digital credential. For example, a transaction key was sent to the department of motor vehicles from the user device that identifies that the user device and/or an associated profile exists and is requesting an mDL. The transaction key can be used by the issuer to issue a digital credential to a specific device and/or profile associated with a user. This can prevent the digital credential from being copied by a different device and/or profile associated with another user. Similarly, the transaction key can be used by the requestor (and the associated requesting device) to identify attempts by unauthorized devices to share fraudulent digital credentials with the requestor. In some examples, the MSO 110 can include an expiration date that identifies when the digital credential 106 is no longer valid. In some examples, the expiration date can be used by the user device 102 to determine that a digital credential 106 cannot be used to generate a response. In some examples, the expiration date can be used by a requesting device to determine that a response is invalid. In some examples, the MSO 110 can include a hash of some or all valid data elements 108 of the digital credential 106 to ensure that the data elements 108 are verifiably immutable.

The user device 102 can store multiple instances of a digital credential 106. For example, the user device 102 can store multiple instances of an mDL and/or multiple instances of a digital passport (also referred to as a mobile passport). Each instance of a digital credential 106 includes the same set of data elements 108 and a different MSO 110. For example, a first instance of an mDL and a second instance of an mDL can include the same data elements such as name, mailing address, etc. as described herein. However, the first instance of an mDL and a second instance of an mDL can have different mobile security objects. The instances of a digital credential 106 can have different issuer signatures, different transaction keys, and/or different hashes of some or all valid data elements 108 as described herein. The user device 102 can generate multiple instances of a digital credential 106 as described herein.

The user device 102 can receive requests 124, 134 from requesting devices 120, 130 for information from a digital credential 106. Requesting devices can be a user device such as a smartphone, smartwatch, tablet, laptop, computer, or computing device, or any other electronic user device configured to request information associated with a digital credential. A requesting device can also be a terminal or a point of sale (POS) device. In some examples, the request can include information regarding the specific requested information. For example, a request could ask for an age or an address. In some examples, the request can include information regarding the type of digital credential to be used. For example, the request can include a request for information specifically from a mDL and/or a digital passport. The requesting devices 120, 130 can be associated with requestors 122, 132 and corresponding profiles such that requestors can have multiple requesting devices associated with each requestor. For example, a requestor could be a bar requesting age information to verify that the user associated with the digital credential is legally allowed to buy and consume alcohol. The requestor can have multiple requesting devices that all associated with the requestor's profile.

The user device 102 can generate responses 126, 136 to transmit to the requesting devices 120, 130. The responses 126, 136 can be generated based on the data elements 108 and the MSO 110 of the digital credential. In some examples, a response can be generated to include the entire digital credential. In some examples, a response can be generated to include a subset of the data elements 108 of the digital credential 106 and the MSO 110. For example, a requesting device could be associated with a zoo that gives discounts to local residents. A request could ask for address information to verify that the user 104 associated with the digital credential 106 is considered a local resident.

Figure 2:
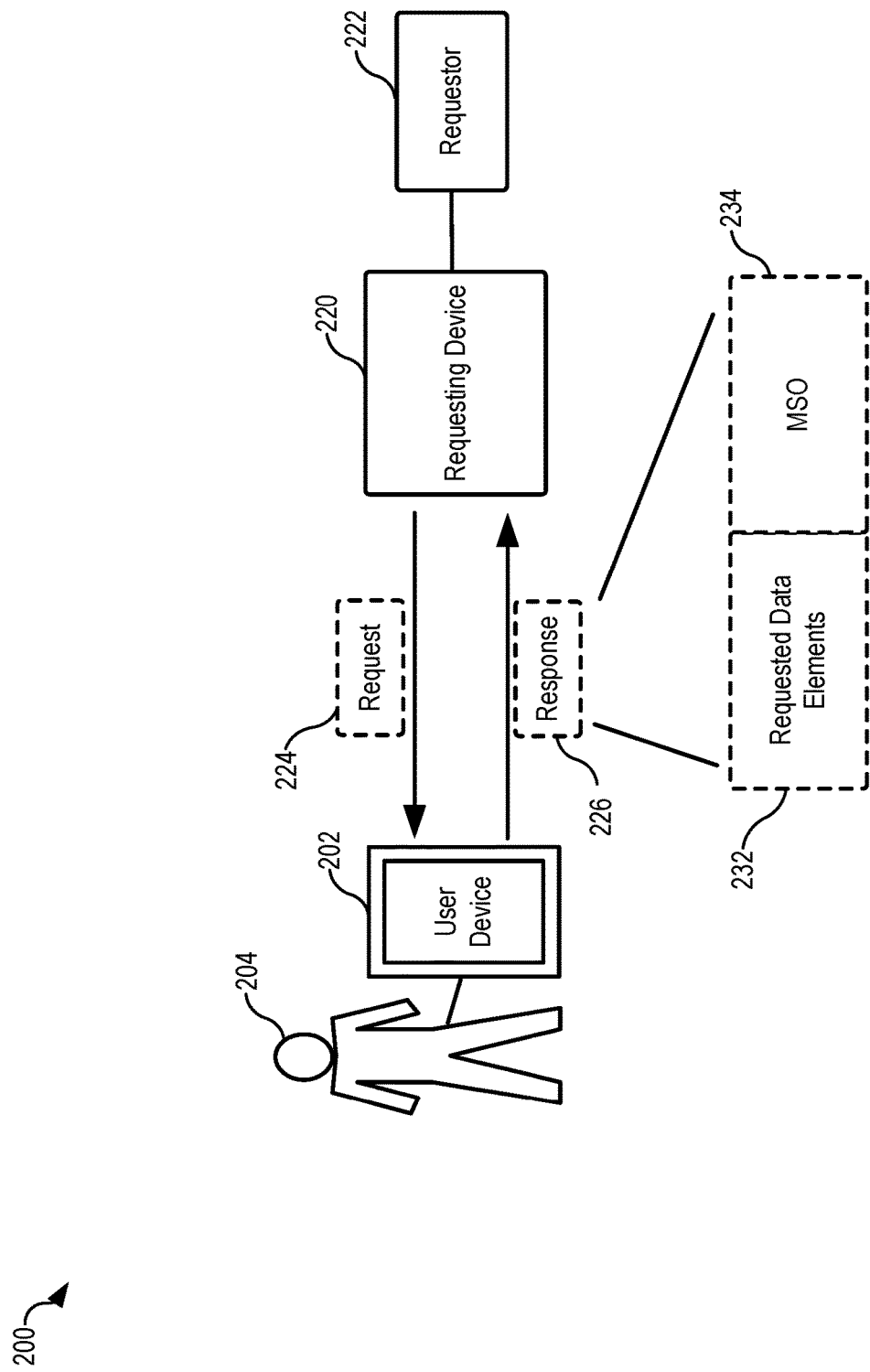
FIG. 2 is a block diagram of an example system for responding to requests for information associated with digital credentials.

FIG. 2 illustrates an example diagram 200 of the digital credential techniques described herein. As described herein, a user device 202 (for example, user device 102 of FIG. 1) associated with a user 204 (for example, user 104 of FIG. 1) can receive a request 224 (for example, requests 124, 134 of FIG. 1), from a requesting device 220 (for example, requesting devices 120, 130 of FIG. 1) associated with a requestor 222 (for example, requestors 122, 132 of FIG. 1) for information regarding a digital credential (for example, the digital credential 106 of FIG. 1) stored on the user device 204. The user device 204 can generate a response 226 (for example, responses 126, 136 of FIG. 1) to transmit to the requesting device 220. The response 226 can include requested data elements 232 and an MSO 234. In some examples, the requested data elements 232 are the data elements (for example, data elements 108 of FIG. 1) associated with the digital credential. In some examples, the requested data elements 232 are a subset of the data elements associated with the digital credential. In some examples, the MSO 234 is the MSO (for example, MSO 110 of FIG. 1) of the digital credential. In some examples, the MSO 234 includes a subset of the elements of the MSO of the digital credential.

In some examples, the request 224 can specify what type of digital credential can be used to generate a response 226. For example, the request 224 can specify that an mDL and/or a digital passport can be used to generate a response 226.

In some examples, when generating a response 226, the user device 202 can determine which type of digital credential to use to generate a response 226. As described herein, a user device can store two or more types of digital credentials. For example, a user device 202 can determine to use an mDL to generate a response 226 to a request 224. Alternatively, a user device 202 can determine to use a digital passport (also referred to as a mobile passport) to generate a response 226 to a request 224. When determining which type of digital credential to use to generate a response, the user device 202 can assign a priority to each type of digital credential such that the user device 202 will use a higher priority type of digital credential over a lower priority type of digital credential. For example, a user device 202 can assign a higher priority to an mDL and a lower priority to a digital passport, such that if both digital credentials can be used to generate a response, the mDL will be used to generate a response due to the higher priority. In some examples, the priority of each type of digital credential can be selected by the user 204 or can be dynamically calculated and/or updated over time.

In some examples, when generating a response 226, the user device 202 can determine which instance of a specific digital credential to use to generate a response 226 as described herein. For example, the user device 202 may have 10 instances of an mDL. A user device 202 can have any number of instances of a specific digital credential. For example, a user device 202 can have 2, 3, 4, 5, 6, 7, 8, 9, 10, 15, 20, 25, 30, 40, 50, 100, or 1000 instances of a specific digital credential. When a requesting device 220 sends a request to the user device 202, the user device 202 can determine which of the 10 instances of the mDL to use when generating the response. As described herein, each instance of the mDL has the same data elements but has different MSOs. Thus, the response 226 will be different based on which instance of the digital credential is used to generate the response 226.

In some examples, the request 224 includes information regarding the requestor 222. In some examples, the request includes information regarding a profile associated with the requestor 222. Multiple requesting devices, such as requesting device 220, of the requestor 222 can be associated with the same profile of the requestor 222. When the user device 202 receives a request 224, the user device 202 can determine if the user device 202 has previously received a request from, or associated with, the profile associated with the requestor 222. If the user device 202 has previously received a request associated with the profile, the user device 202 can use the same instance of a digital credential to generate a response. For example, the user device 202 could receive a request to verify age from a first requesting device associated with a bar as a requestor. The user device 202 can generate a response 226 using a first instance of an mDL and transmit it to the first requesting device. At a later time, a second requesting device associated with the bar can send a request to verify age to the user device 202. The request can include information regarding the profile of the bar and the user device 202 can determine that the bar has previously requested information from the user device. The user device 202 can determine to use the first instance of the mDL to generate a response and transmit the response to the second requesting device. Likewise, if the first requesting device sends a request 224 to the user device 202, the request can include information regarding the profile of the bar and the user device 202 can determine that the bar has previously requested information from the user device 202 and determine to use the first instance of the mDL to generate a response.

In some examples, the user device 202 can store the profile information and associate the profile information with the specific instance used to generate a response to a request from the associated requestor 222. For example, the user device can associate profile information from a bank that requested information from an mDL with a fourth instance of the mDL stored on the user device. Thus, when the user device receives a request from a requesting device associated with the bank, the user device can use the fourth instance of the mDL to generate a response. By using the same instance of a digital credential to process requests associated with the same requestor, the instances of the digital credentials can be used efficiently and require less storage capacity and/or computing resources by the user device. As described herein, using different instances of digital credentials for at least some number of requestors decreases the ability for requestors to collude and share information regarding a user and/or an associated digital credential without the permission and/or knowledge of the associated user.

In some examples, the user device 202 can determine that a profile associated with the requesting device has not previously requested information from the user device 202. The request 224 can include profile information associated with the requestor 222 and enable the user device 202 to determine that the user device 202 has not previously received a request from any device associated with the requestor 222. The user device 202 can then determine an instance of the digital credential from which to generate a response. In some examples, the user device 202 can select an unused instance of the digital credential. For example, the user device 202 can determine that a fifth instance of an mDL has not been used to generate a response and determine to use that fifth instance of the mDL to generate a response. As described herein, using different instances of digital credentials for at least some number of requestors decreases the ability for requestors to collude and share information regarding a user and/or an associated digital credential without the permission and/or knowledge of the associated user.

In some examples, the user device 202 can select a least used instance of the digital credential. For example, a user device 202 may store ten instances of a digital credential. Nine of the instances of the digital credential have been each used for three requestors, and a tenth instance has only been used for two requestors. The user device 202, when generating a response to a request associated with a new requestor, can determine to use the tenth instance to generate a response to the request from the new requestor.

In some examples, the user device 202 can determine that all instances of a digital credential have been associated with a threshold number of requestors. The user device 202 can then generate new digital credentials as described herein. In some examples, the threshold number can be one while in some examples, the threshold number can be two, three, four, five, six, seven, eight, nine, ten, twenty, or one hundred. In some examples, the user device 202 can generate new digital credentials using the techniques described herein to add to the list of usable digital credentials. In some examples, the user device 202 can generate new digital credentials and delete and/or remove the existing digital credentials stored on the device.

In some examples, the request 224 can include a certificate indicative of a profile for the requestor 222 associated with the requesting device 220. The certificate can indicate what type of requestor is requesting information. For example, a certificate could indicate that the requestor 222 is a bank, a bar, airport security, etc. The user device 202 can use the certificate to generate the response 226 and determine which data elements from the digital credential to include as the requested data elements 232 in the response 226.

In some examples, when generating a response 226, the user device 202 can determine which data elements from the digital credential to include as the requested data elements 232 in the response 226 based on location information of the user device 202. For example, the user device 202 can determine that it is located at a specific bar based on location information of the user device 202. The user device 202 can determine which data elements from the digital credential to include as the requested data elements 232 in the response 226 based on the specific location or a type of location. For example, the user device 202 can determine that the user device 202 is at a bar and bars request age information. Alternatively, the user device 202 can determine that the user device 202 is located at a specific government building that requests a specific set of information.

In some examples, when generating a response 226, the user device 202 can determine which data elements from the digital credential to include as the requested data elements 232 in the response 226 based on selections by the user 204. For example, a user device 202 can receive a request 224 requesting specific information like age. The user 204 can select, on the user device 202, what data elements to include as requested data elements 232 when generating a response 226. For example, the user 204 can select age, name, and birthday after receiving a request 224 to be used in generating a response 226.

In some examples, when generating a response 226, the user device 202 can determine which data elements from the digital credential to include as the requested data elements 232 in the response 226 based specifically requested information in the request 224. For example, a request 244 may specifically ask for an age, a name, and an address such that the response 226 can be generated with an age, a name, and an address as requested.

Figure 3:
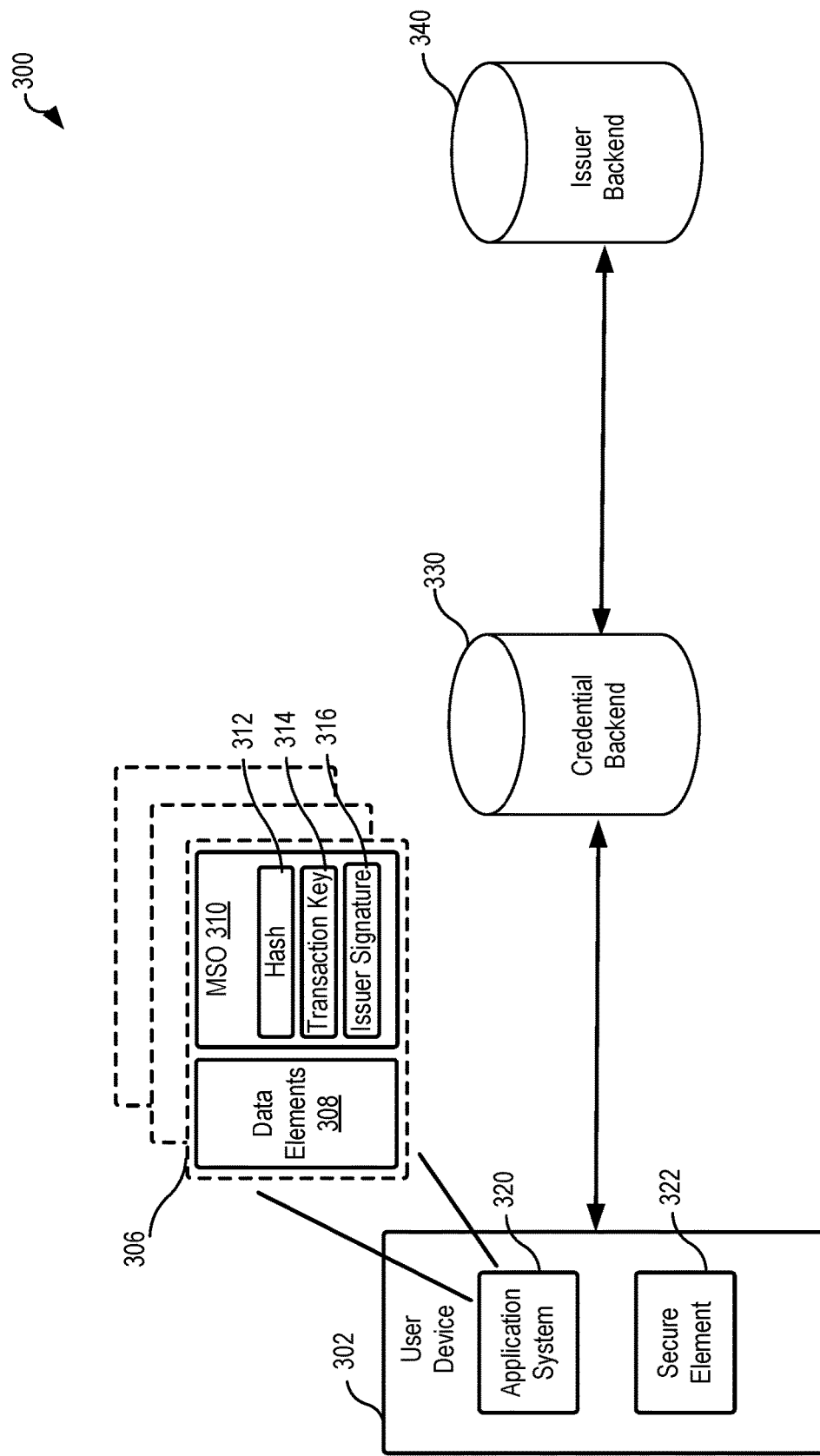
FIG. 3 is a block diagram of an example system for generating digital credentials.

FIG. 3 illustrates an example diagram 300 of digital credential techniques described herein. The user device 302 (for example, user device 102 of FIG. 1) has an application system 320, which constitutes an application layer and the hardware for processing, computing, and managing application and other software as described below in relation to FIG. 8, and a secure element (SE) 322. The application system 320 stores some or all of the digital credential 306 (for example, digital credential 106 of FIG. 1) in memory and/or storage. As described herein, the digital credential 306 includes data elements 308 (for example, data elements 108 of FIG. 1) and an MSO 310 (for example, the MSO 110 of FIG. 1). The MSO 310 includes a hash 312, a transaction key 314, and an issuer signature 316. In some examples, parts of the digital credential are stored and/or generated in the SE 322. As described herein, the user device 302 can store multiple digital credentials, including multiple types of digital credentials and/or multiple instances of a single type of digital credential. During generation of a digital credential or set of digital credentials, the user device 302 can transmit and receive information from a credential backend 330. The credential backend 330 can be a first party backend including servers and/or other computing devices that are configured to assist the user device 302 in generating a digital credential or set of digital credentials. The credential backend 330 can communicate with an issuer backend 340 associated with the issuer of a digital credential or set of digital credentials. The credential backend 330 can transmit information to and receive information from the issuer backend 340. The issuer backend 340 can include servers and/or other computing devices configured to generate digital credentials.

Figure 4:
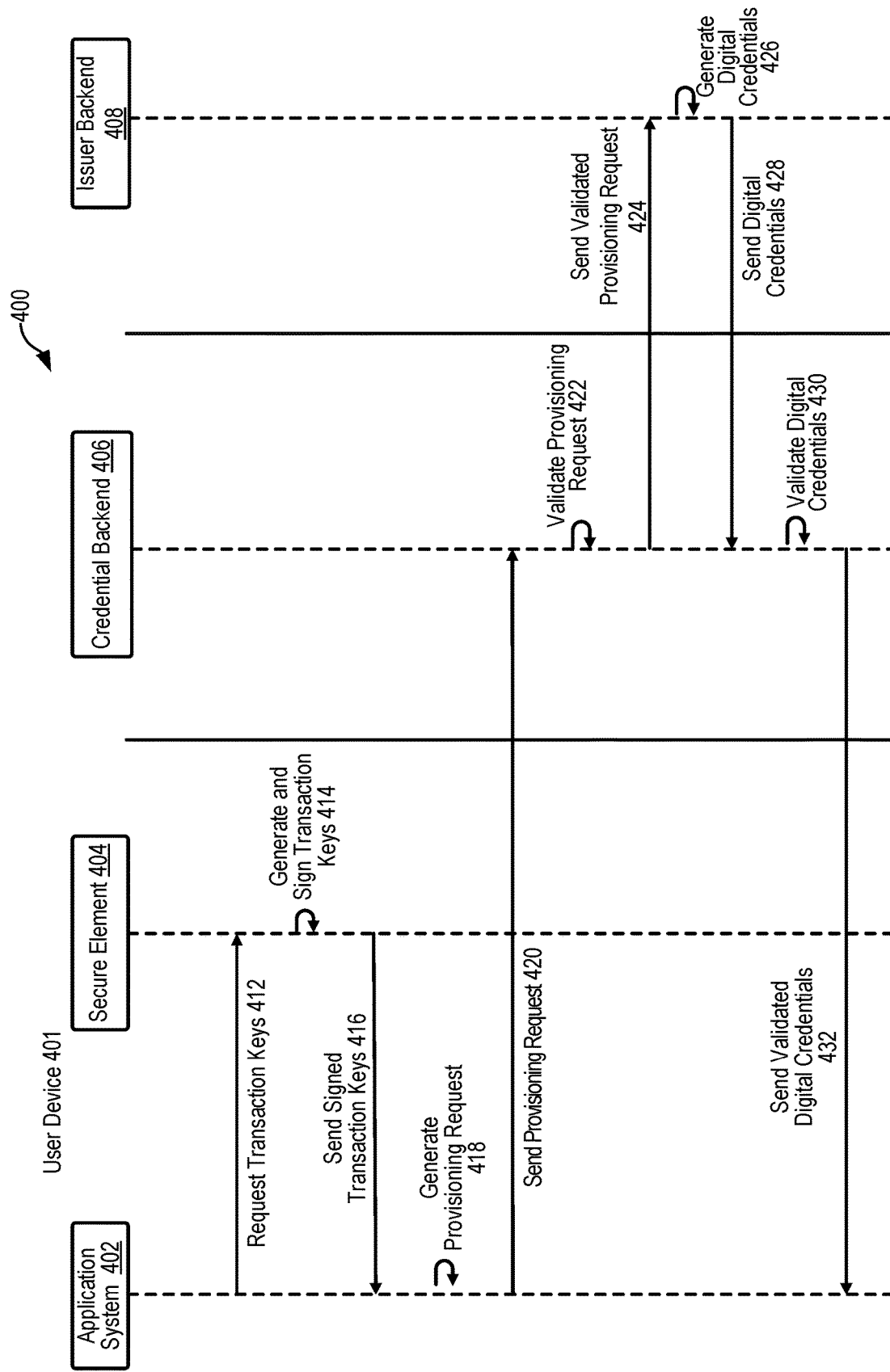
FIG. 4 is a flow diagram of an example process for implementing the techniques described herein.

FIG. 4 illustrates an example sequence diagram 400 of digital credential techniques described herein. The sequence diagram 400 illustrates example steps in the process of generating digital credentials (for example, digital credential 106 of FIG. 1), including generating multiple instances of a digital credential. The user device 401 (for example, the user device 102 of FIG. 1) includes both an application system 402 (for example, the application system 320 of FIG. 3) and a secure element 404 (for example, the secure element 322 of FIG. 3). In some examples, the generation of the digital credentials can be a first-time creation of the type of digital credential. For example, a user device can be starting the process for generating an mDL, which the user devices have never stored before. In some examples, the generation of the digital credentials can be based on a determination that a threshold criterion has been met regarding a previous set of credentials as described herein. For example, each instance of a digital credential has been used to respond to requests from a threshold number of requestors as described herein. Whenever information is sent between different systems and/or devices, the information can be encrypted.

At block 412, the application system 402 of the user device 401 can request a set of transaction keys from the secure element 404. Each transaction key in the set of transaction keys is used for signing the response to a request for information such that a requestor can know that the information from the digital credential is authentic and comes from an authorized digital credential issued by an issuer for the specific device and/or user. At block 414, the secure element 404 can generate the set of transaction keys and sign the transaction keys to generate a set of signed transaction keys. The secure element also generates a protected private key that corresponds to each signed transaction key of the set of signed transaction keys. By signing the transaction keys, other devices and servers can determine that the transaction keys have been authorized and/or certified by a proper user device 401. At block 416, the secure element 404 can send the signed transaction keys and the protected private keys to the application system 402. The protected private keys can be stored by the application system 402, but the protected private keys are signed and encrypted by the secure element 404 such that the protected private keys cannot be used or modified by any other parties or software except by the secure element 404.

At block 418, the application system 402 can generate a provisioning request. The provisioning request can include the set of signed transaction keys (which can also be referred to as the list of transaction keys). The provisioning request can also include a device encryption key. In some examples, the device encryption key can be used by the issuer backend 408 to encrypt the instances of the digital credential such that only the user device 401 can decrypt the instances of the digital credential. In some examples, the device encryption key can be used by the credential backend 406 to decrypt the encrypted digital credentials to validate the digital credentials. The device encryption key included in the provisioning request can be a public device encryption key that corresponds to a private device encryption key. The private device encryption key is kept on the device to decrypt the instances of the digital credential.

At block 420, the application system 402 can send the provisioning request to the credential backend 406 (for example, the credential backend 330 of FIG. 3). As described herein, the credential backend 406 can be a backend system that assists the user device 401 in generating multiple instances of a digital credential. At block 422, the credential backend 406 can validate the provisioning request. The credential backend 406 can validate the provisioning request by verifying the signature of the set of transaction keys and by validating the device encryption key. At block 424, the credential backend 406 can send the validated provisioning request to the issuer backend 408 (for example, the issuer backend 340 of FIG. 3).

The issuer backend 408 can then process the validated provisioning request and generate multiple instances of a digital credential. The issuer backend 408 can generate a 1:1 ratio of instances of a digital credential to the number of transaction keys in the validated provisioning request. For example, if the validated provisioning request includes five transaction keys, the issuer backend 408 can generate five instances of a digital credential. As described herein, the digital credential includes data elements (for example, data elements 108 of FIG. 1) and an MSO (for example, MSO 110 of FIG. 1). The instances of a digital credential can have the same data elements but have different MSOs. For example, an issuer backend 408 can generate five instances of an mDL. The five instances can all have the same data elements such as name, age, address, and the like. However, the five instances can have different MSOs, for example, having different hashs (for example, hash 312 of FIG. 3), different transaction keys (for example, transaction key 314 of FIG. 3), and different issuer signatures (for example, issuer signature 316 of FIG. 3).

In some examples, the validated provisioning request can include the information for the data elements of the digital credential. For example, the validated provisioning request could include the name, age, birthday that will become data elements of the digital credential. In some examples, the information for the data elements of the digital credential is already sent to and/or received by the issuer backend 408. For example, the department of motor vehicles may already have the information for the data elements of the mDL because the department of motor vehicles acts as the system of record for the associated driver's license.

At block 426, the issuer backend 408 can generate the set of instances of the digital credentials based on the validated provisioning request. After the issuer backend 408 generates the set of instances of the digital credentials, the issuer backend 408 can encrypt the set of instances of the digital credential using the device encryption key.

At block 428, the issuer backend 408 can send the set of instances of the digital credentials to the credential backend 406. In some examples, at block 430, the credential backend 406 can validate the set of instances of the digital credentials after using the device encryption key to decrypt the set of instances of the digital credential. The validation by the credential backend 406 validates that the issuer backend 408 properly generated the set of instances of the digital credential. The validation by the credential backend 406 also ensures that a certified/authorized issuer backend actually generated the set of instances of the digital credential, and not a bad actor. In some examples, the credential backend 406 does not validate the set of instances of the digital credential. For example, the credential backend 406 may not have access to the device encryption key and thus cannot decrypt the encrypted set of instances of the credential. At block 432, the credential backend 406 sends the set of instances of the digital credential to the application system 402 of the user device 401. Once the user device 401 receives the instances of the digital credential, the user device can decrypt the instances of the digital credential using the private device encryption key. The user device 401 can store the set of instances of the digital credential or parts of the set of instances of the digital credential in the application system 402 and/or the secure element 404 as described herein. In some examples, the application system 402 can generate a symmetric payload protection key that is used to encrypt the instances of the digital credential during storage by the application system 402. The instances of the digital credential can be decrypted using the decryption aspect of the symmetric payload protection key when information from the digital credential is requested by a requesting device. The decryption of the instances of the digital credential can be done after a user has authorized decryption through biometrics or passcode.

Figure 5:
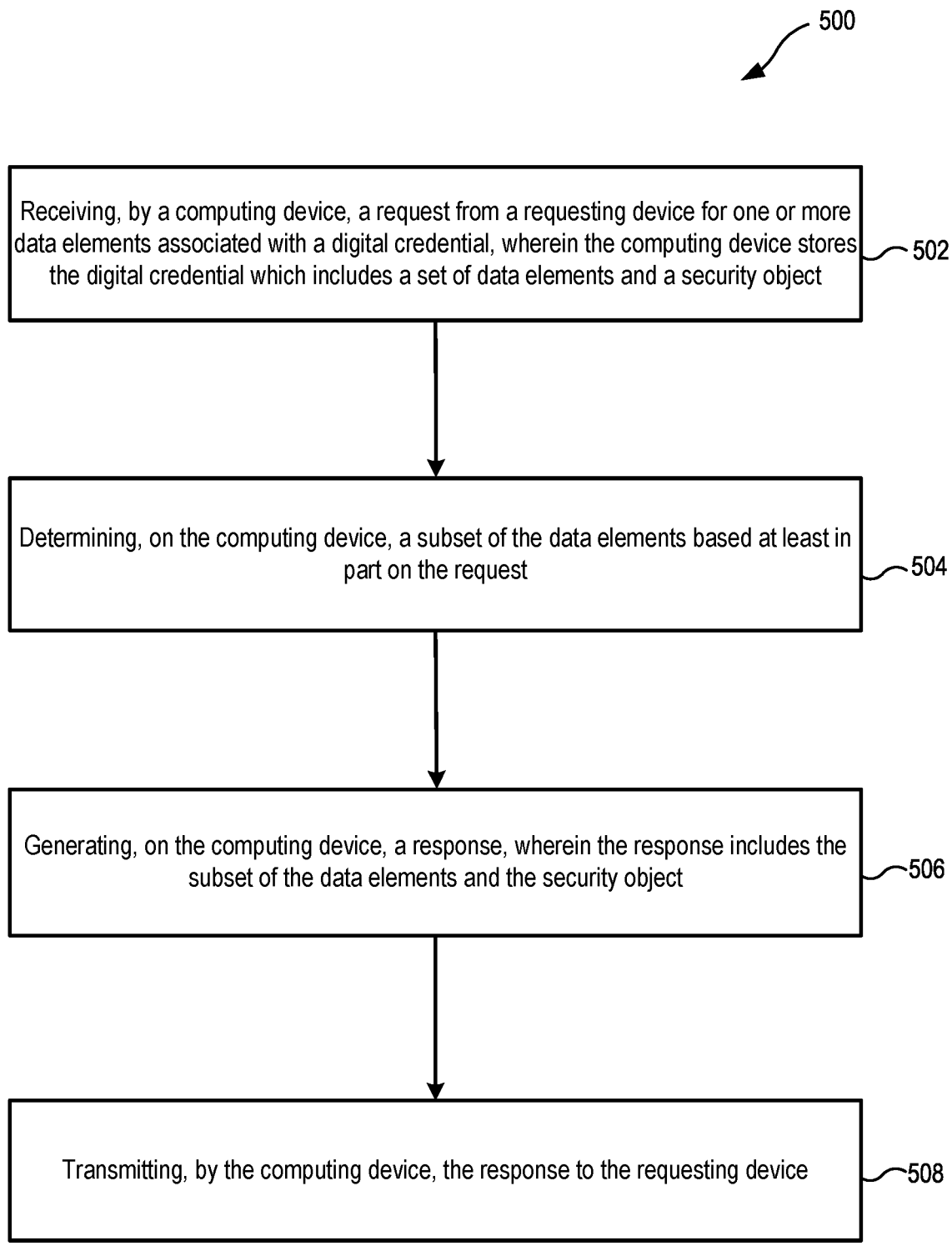
FIG. 5 is a flow diagram of an example process for implementing the techniques described herein.

FIG. 5 is a flow diagram illustrating an example process 500 for generating a response to a request for information as described herein. Process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes. A request (for example, requests 124, 134 of FIG. 1) for information from a digital credential (for example, the digital credential 106 of FIG. 1) can be sent from a requesting device (for example, requesting devices 120, 130 of FIG. 1) associated with a requestor (for example, requestors 122, 132 of FIG. 1) to a user device (for example, user device 102 of FIG. 1) associated with a user (for example, user 104 of FIG. 1). The user device can generate a response (for example, responses 126, 136 of FIG. 1) based on the digital credential which can include some or all of data elements (for example, data elements 108 of FIG. 1) associated with the digital credential. The response can also include an MSO (for example, MSO 110 of FIG. 1).

The process may begin at 502. A computing device (for example, the user device 102 of FIG. 1) can receive a request from a requesting device for one or more data elements associated with a digital credential as described herein. The computing device can store the digital credential which includes a set of data elements and a security object. The data elements can be associated with a user, wherein the data elements can include one or more of: a name, an age, a birthday, a residential address, a picture of the user, a gender, a hair color, an eye color, a height, and a weight. The security object can include an issuer signature, a transaction key associated with the computing device, and a hash. The hash can include at least a subset of data elements. In some examples, the hash can include other inputs such as a random value and/or identifiers associated with the data elements. The security object can include an expiration date. The computing device can store two or more types of digital credentials. The computing device can determine a type of credential for generating the response.

The computing device can store multiple instances of the digital credential. Each instance can include a same set of data elements and a different security object. The requesting device can be associated with a profile, The request can include profile information regarding the profile. The computing device can further determine an instance of the digital credential for generating the response. Determining the instance of the digital credential can include determining whether the computing device has received a previous request associated with the profile for data elements associated with the digital credential. In accordance with determining the computing device has received a previous request associated with the profile for data elements associated with the digital credential, the computing device can determine to use a same instance of the digital credential used to generate a previous response to the previous request for generating the response. In accordance with determining the computing device has not received a previous request associated with the profile for data elements associated with the digital credential, the computing device can determine to use a least-used instance of the digital credential for generating the response.

At 504, the computing device can determine a subset of the data elements based at least in part on the request as described herein. Determining the subset of the data elements can be based on specific data elements specified in the request.

At 506, the computing device can generate a response as described herein. The response can include the subset of the data elements and the security object. The response can be generated based on the digital credential stored on the computing device. Determining the subset of the data elements can be based on a certificate indicative of a profile associated with the requesting device. Determining the subset of the data elements can be based on location information of the computing device. Determining the subset of the data elements can be further based on selection by a user associated with the computing device.

At 508, the computing device can transmit the response to the requesting device as described herein.

Figure 6:
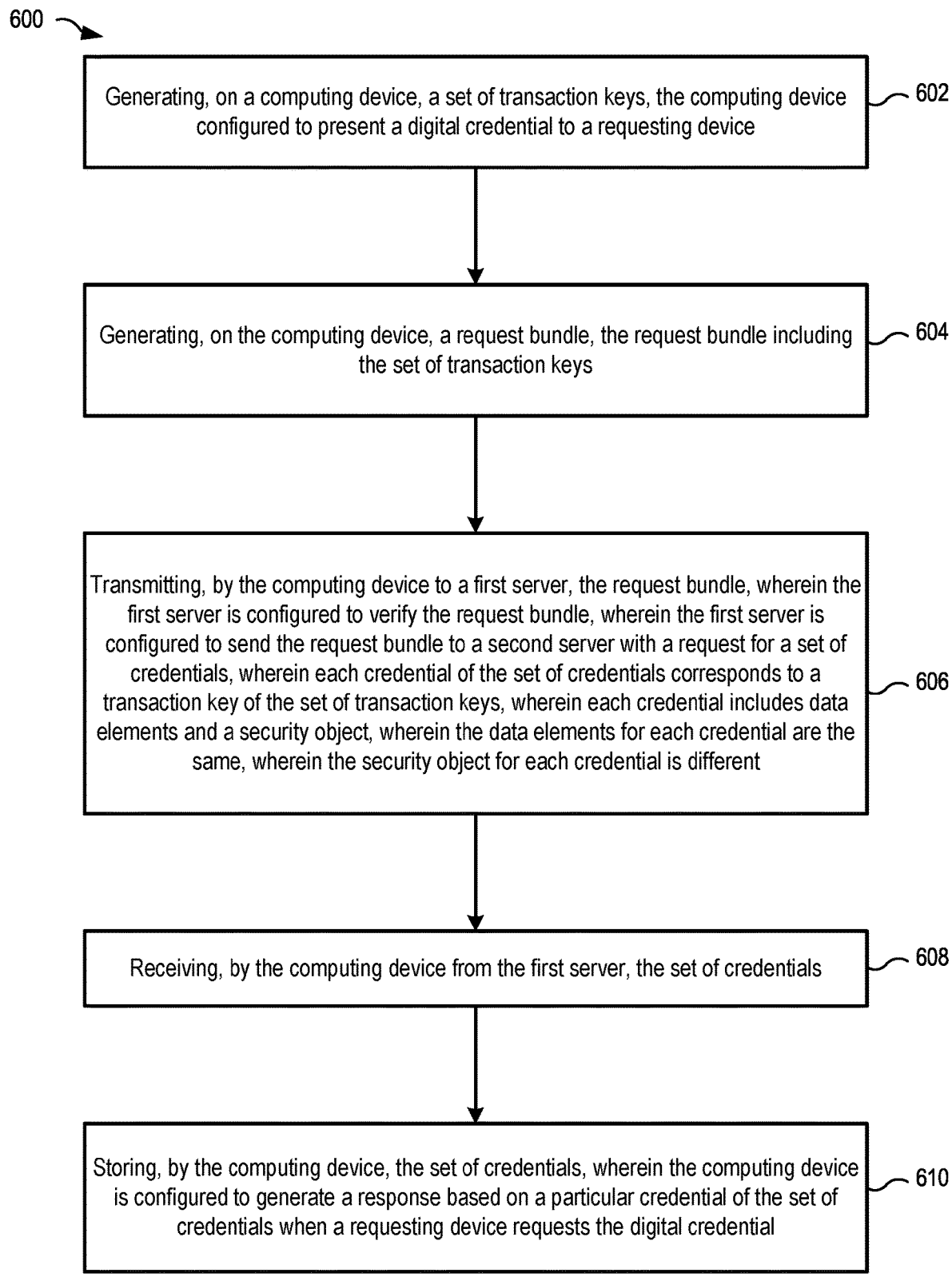
FIG. 6 is a flow diagram of an example process for implementing the techniques described herein.

FIG. 6 is a flow diagram illustrating an example process 600 for a digital credential or a set of digital credentials as described herein. Process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes. A user device (for example, user device 102 of FIG. 1) can begin the process of generating a digital credential (for example, digital credential 106 of FIG. 1). The user device can send provisioning request including a set of signed transaction keys to a first server (for example, credential backend 330 of FIG. 3). The first server can verify the signed transaction keys and send a validated provisioning request to a second server (for example, issuer backend 340 of FIG. 3). The second server can generate the set of instances of a digital credential and send them to the first server. The first server can send the set of instances of a digital credential to the user device.

The process may begin at 602. A computing device (for example, the user device 102 of FIG. 1) can generate a set of transaction keys. The computing device can be configured to present a digital credential to a requesting device. In some examples, the computing device can sign each transaction key of the set of transaction keys. In some examples, the computing device can determine to generate the set of credentials based on a threshold criterion being met regarding a previous set of credentials.

At 604, the computing device can generate a request bundle. The request bundle can include the set of transaction keys. The request bundle can refer to the provisioning request associated with FIG. 4.

At 606, the computing device can transmit, to a first server, the request bundle. The first server can be configured to verify the request bundle. The first server can be configured to send the request bundle to a second server with a request for a set of credentials. Each credential of the set of credentials can correspond to a transaction key of the set of transaction keys. Each credential can include data elements and a security object. The data elements for each credential can be the same. The security object for each credential can be different.

At 608, the computing device can receive, from the first server, the set of credentials.

At 610, the computing device can store the set of credentials. The computing device can be configured to generate a response based on a particular credential of the set of credentials when a requesting device requests the digital credential. The requesting device can be associated with a profile. The computing device can be configured to determine the computing device has received a previous request associated with the profile for data elements associated with the digital credential. The computing device can be configured to generate the response based on a same credential of the set of credentials used to generate a previous response to the previous request.

Figure 7:
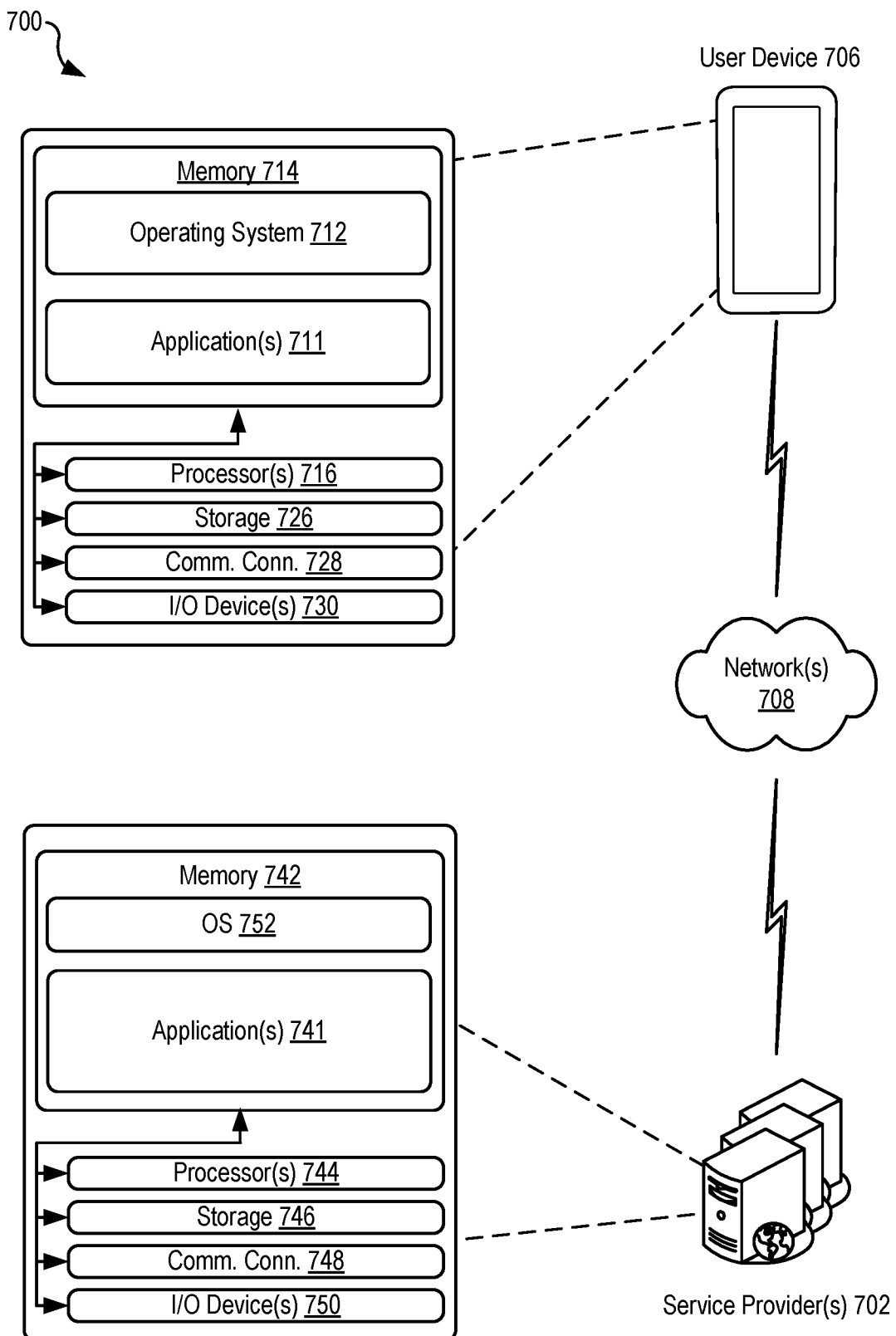
FIG. 7 shows a simplified block diagram of an example system architecture for a controller.

FIG. 7 illustrates an example architecture or environment 700 configured to implement techniques described herein, according to at least one example. In some examples, the example architecture 700 may further be configured to enable a user device 706 and service provider computer 702 to share information. The service provider computer 702 is an example of the credential backend 330 and issuer backend 340. The user device 706 is an example of the user device 102. In some examples, the devices may be connected via one or more networks 708 (e.g., via Bluetooth, WiFi, the Internet). In some examples, the service provider computer 702 may be configured to implement at least some of the techniques described herein with reference to the user device 706 and vice versa.

In some examples, the networks 708 may include any one or a combination of many different types of networks, such as cable networks, the Internet, wireless networks, cellular networks, satellite networks, other private and/or public networks, or any combination thereof. While the illustrated example represents the user device 706 accessing the service provider computer 702 via the networks 708, the described techniques may equally apply in instances where the user device 706 interacts with the service provider computer 702 over a landline phone, via a kiosk, or in any other manner. It is also noted that the described techniques may apply in other client/server arrangements (e.g., set-top boxes), as well as in non-client/server arrangements (e.g., locally stored applications, peer-to-peer configurations).

As noted above, the user device 706 may be any type of computing device such as, but not limited to, a mobile phone, a smartphone, a personal digital assistant (PDA), a laptop computer, a desktop computer, a thin-client device, a tablet computer, a wearable device such as a smart watch, or the like. In some examples, the user device 706 may be in communication with the service provider computer 702 via the network 708, or via other network connections.

In one illustrative configuration, the user device 706 may include at least one memory 714 and one or more processing units (or processor(s)) 716. The processor(s) 716 may be implemented as appropriate in hardware, computer-executable instructions, firmware, or combinations thereof. Computer-executable instruction or firmware implementations of the processor(s) 716 may include computer-executable or machine-executable instructions written in any suitable programming language to perform the various functions described. The user device 706 may also include geo-location devices (e.g., a global positioning system (GPS) device or the like) for providing and/or recording geographic location information associated with the user device 706.

The memory 714 may store program instructions that are loadable and executable on the processor(s) 716, as well as data generated during the execution of these programs. Depending on the configuration and type of the user device 706, the memory 714 may be volatile (such as random access memory (RAM)) and/or non-volatile (such as read-only memory (ROM), flash memory). The user device 706 may also include additional removable storage and/or non-removable storage 726 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 714 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 714 and the additional storage 726, both removable and non-removable, are all examples of non-transitory computer-readable storage media. For example, non-transitory computer-readable storage media may include volatile or non-volatile, removable or non-removable media implemented in any method or technology for storage of information such as computer-readable instructions, data structures, program modules, or other data. The memory 714 and the additional storage 726 are both examples of non-transitory computer-storage media. Additional types of computer-storage media that may be present in the user device 706 may include, but are not limited to, phase-change RAM (PRAM), SRAM, DRAM, RAM, ROM, Electrically Erasable Programmable Read-Only Memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 706. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The user device 706 may also contain communications connection(s) 728 that allow the user device 706 to communicate with a data store, another computing device or server, user terminals, and/or other devices via the network 708. The user device 706 may also include I/O device(s) 730, such as a keyboard, a mouse, a pen, a voice input device, a touch screen input device, a display, speakers, and a printer.

Turning to the contents of the memory 714 in more detail, the memory 714 may include an operating system 713 and/or one or more application programs or services for implementing the features disclosed herein such as applications 711 (e.g., the application system 320, health application, digital wallet, third-party applications, browser application). Applications 711 can perform some or all the techniques as described with reference to the processes 400, 500, 600. Similarly, at least some techniques described with reference to the service provider computer 702 may be performed by the user device 706.

The service provider computer 702 may also be any type of computing device such as, but not limited to, a collection of virtual or "cloud" computing resources, a remote server, a mobile phone, a smartphone, a PDA, a laptop computer, a desktop computer, a thin-client device, a tablet computer, a wearable device, a server computer, or a virtual machine instance. In some examples, the service provider computer 702 may be in communication with the user device 706 via the network 708, or via other network connections.

In one illustrative configuration, the service provider computer 702 may include at least one memory 742 and one or more processing units (or processor(s)) 744. The processor(s) 744 may be implemented as appropriate in hardware, computer-executable instructions, firmware, or combinations thereof. Computer-executable instruction or firmware implementations of the processor(s) 744 may include computer-executable or machine-executable instructions written in any suitable programming language to perform the various functions described.

The memory 742 may store program instructions that are loadable and executable on the processor(s) 744, as well as data generated during the execution of these programs. Depending on the configuration and type of service provider computer 702, the memory 742 may be volatile (such as RAM) and/or non-volatile (such as ROM and flash memory). The service provider computer 702 may also include additional removable storage and/or non-removable storage 746 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 742 may include multiple different types of memory, such as SRAM, DRAM, or ROM. While the volatile memory described herein may be referred to as RAM, any volatile memory that would not maintain data stored therein, once unplugged from a host and/or power, would be appropriate. The memory 742 and the additional storage 746, both removable and non-removable, are both additional examples of non-transitory computer-readable storage media.

The service provider computer 702 may also contain communications connection(s) 748 that allow the service provider computer 702 to communicate with a data store, another computing device or server, user terminals, and/or other devices via the network 708. The service provider computer 702 may also include I/O device(s) 750, such as a keyboard, a mouse, a pen, a voice input device, a touch input device, a display, speakers, and a printer.

Turning to the contents of the memory 742 in more detail, the memory 742 may include an operating system 752 and/or one or more application programs 741 or services for implementing the features disclosed herein.

The various examples can be further implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In examples utilizing a network server, the network server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, keypad), and at least one output device (e.g., a display device, printer, speaker). Such a system may also include one or more storage devices, such as disk drives, optical storage devices, and solid-state storage devices such as RAM or ROM, as well as removable media devices, memory cards, flash cards, etc.

Such devices can also include a computer-readable storage media reader, a communications device (e.g., a modem, a network card (wireless or wired), an infrared communication device), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Non-transitory storage media and computer-readable media for containing code, or portions of code, can include any appropriate media known or used in the art, including storage media, such as, but not limited to, volatile and non-volatile, removable and non-removable media implemented in any method or technology for storage of information such as computer-readable instructions, data structures, program modules, or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering and use of data available from various sources to provide a comprehensive and complete window to a user's personal health record. The present disclosure contemplates that in some instances, this gathered data may include personally identifiable information (PII) data that uniquely identifies or can be used to contact or locate a specific person. Such personal information data can include demographic data, location-based data, telephone numbers, email addresses, Twitter IDs, home addresses, data or records relating to a user's health or level of fitness (e.g., vital sign measurements, medication information, exercise information), date of birth, health record data, or any other identifying or personal or health information.

The present disclosure recognizes that the use of such personal information data, in the present technology, can be used to the benefit of users. For example, the personal information data can be used to provide enhancements to a user's personal health record. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services or other services relating to health record management, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method comprising:
  receiving, by a computing device, a request from a requesting device for one or more data elements associated with a digital credential, wherein the computing device stores multiple instances of the digital credential, wherein each instance includes a same set of data elements and a different security object, and wherein the requesting device is associated with a profile;
  determining, on the computing device, a first instance of the digital credential for generating a response, wherein determining the first instance of the digital credential for generating the response includes:
    determining, on the computing device, whether the computing device has received a previous request associated with the profile for data elements associated with the digital credential;
    in accordance with a determination that the computing device has received a previous request associated with the profile for data elements associated with the digital credential, determining to use a same instance of the digital credential used to generate a previous response to the previous request as the first instance for generating the response; and in accordance with a determination that the computing device has not received a previous request associated with the profile for data elements associated with the digital credential, determining to use a second instance of the digital credential as the first instance for generating the response;

determining, on the computing device, a subset of data elements from the first instance of the digital credential based at least in part on the request;

generating, on the computing device, the response, wherein the response includes the subset and a security object from the first instance of the digital credential; and transmitting, by the computing device, the response to the requesting device.

2. The method of claim 1, wherein the computing device stores two or more types of digital credentials, the method further comprising:

determining, on the computing device, a type of credential for generating the response.

3. The method of claim 1, wherein the request includes profile information regarding the profile.

4. The method of claim 1, wherein determining the subset of data elements is based on specific data elements specified in the request.

5. The method of claim 1, wherein determining the subset of data elements is based on a certificate indicative of the profile.

6. The method of claim 1, wherein determining the subset of data elements is based on location information of the computing device.

7. The method of claim 1, wherein determining the subset of data elements is based on selection by a user associated with the computing device.

8. The method of claim 1, wherein the security object comprises an issuer signature, a transaction key associated with the computing device, and a hash of at least a second subset of data elements.

9. The method of claim 1, wherein the security object includes an expiration date.

10. The method of claim 1, wherein the one or more data elements are associated with a user, wherein the one or more data elements include one or more of: a name, an age, a birthday, a residential address, a picture of the user, a gender, a hair color, an eye color, a height, and a weight.

11. The method of claim 1, wherein the second instance of the digital credential is a least used instance of the digital credential.

12. A computing device, comprising:
a memory configured to store computer-executable instructions; and
one or more processors in communication with the memory and configured to access the memory and execute the computer-executable instructions to:
receive a request from a requesting device for one or more data elements associated with a digital credential, wherein the computing device stores multiple instances of the digital credential, wherein each instance includes a same set of data elements and a different security object, and wherein the requesting device is associated with a profile;
determining, on the computing device, a first instance of the digital credential for generating a response, wherein determining the first instance of the digital credential for generating the response includes:
determining, on the computing device, whether the computing device has received a previous request associated with the profile for data elements associated with the digital credential;
in accordance with a determination that the computing device has received a previous request associated with the profile for data elements associated with the digital credential, determining to use a same instance of the digital credential used to generate a previous response to the previous request as the first instance for generating the response; and
in accordance with a determination that the computing device has not received a previous request associated with the profile for data elements associated with the digital credential, determining to use a second instance of the digital credential as the first instance for generating the response;
determine a subset of data elements from the first instance of the digital credential based at least in part on the request;
generate the response, wherein the response includes the subset and a security object from the first instance of the digital credential; and
transmit the response to the requesting device.

13. The computing device of claim 12, wherein the request includes profile information regarding the profile.

14. The computing device of claim 12, wherein determining the subset of data elements is based on location information of the computing device.

15. The computing device of claim 12, wherein the second instance of the digital credential is a least used instance of the digital credential.

16. One or more non-transitory computer-readable media comprising computer-executable instructions that, when executed by one or more processors, cause the one or more processors to perform operations comprising:
receiving, by a computing device, a request from a requesting device for one or more data elements associated with a digital credential, wherein the computing device stores multiple instances of the digital credential, wherein each instance includes a same set of data elements and a different security object, and wherein the requesting device is associated with a profile;
determining, on the computing device, a first instance of the digital credential for generating a response, wherein determining the first instance of the digital credential for generating the response includes:
determining, on the computing device, whether the computing device has received a previous request associated with the profile for data elements associated with the digital credential;
in accordance with a determination that the computing device has received a previous request associated with the profile for data elements associated with the digital credential, determining to use a same instance of the digital credential used to generate a previous response to the previous request as the first instance for generating the response; and
in accordance with a determination that the computing device has not received a previous request associated with the profile for data elements associated with the digital credential, determining to use a second instance of the digital credential as the first instance for generating the response;

determining, on the computing device, a subset of data elements from the first instance of the digital credential based at least in part on the request;

generating, on the computing device, the response, wherein the response includes the subset and a security object from the first instance of the digital credential; and transmitting, by the computing device, the response to the requesting device.

17. The one or more non-transitory computer-readable media of claim 16, wherein the request includes profile information regarding the profile.

18. The one or more non-transitory computer-readable media of claim 16, wherein determining the subset of data elements is based on a certificate indicative of the profile.

19. The one or more non-transitory computer-readable media of claim 16, wherein the security object comprises an issuer signature, a transaction key associated with the computing device, and a hash of at least a second subset of data elements.

20. The one or more non-transitory computer-readable media of claim 16, wherein the second instance of the digital credential is a least used instance of the digital credential.

* * * * *